United States Patent [19]

Schumacher, II et al.

[11] 3,736,737
[45] June 5, 1973

[54] CONTROL DEVICE FOR RAISING AND LOWERING THE CUTTER MECHANISM OF HARVESTERS

[76] Inventors: Gustav Schumacher, II; Günter Schumacher, both of Haus near 51, 5231 Eichelhardt, Germany

[22] Filed: May 21, 1971

[21] Appl. No.: 145,621

[30] Foreign Application Priority Data

Nov. 18, 1970 Germany..................P 20 56 931.7

[52] U.S. Cl..............................56/208, 56/DIG. 15
[51] Int. Cl................................A01d 67/00
[58] Field of Search..................56/10.4, DIG. 15, 56/208-217

[56] References Cited

UNITED STATES PATENTS

| | | | |
|---|---|---|---|
| 3,509,701 | 5/1970 | Clarke | 56/208 |
| 3,568,420 | 3/1971 | Hofer et al. | 56/208 |

Primary Examiner—Louis G. Mancene
Assistant Examiner—J. A. Oliff
Attorney—Steinberg & Blake

[57] ABSTRACT

A hydraulic control device for raising and lowering the cutter mechanism of a harvester, for example a combine harvester, which device is operable by manual actuation and by the hydraulic pressure in a displacement cylinder of the cutter mechanism through a control cylinder acting against a counterforce, and which device is for installation on a part of the combine harvester, preferably the drivers platform, which constitutes a stationary part as opposed to the movable cutter mechanism, wherein the arrangement of the actuating lever of the "raise" valve and/or the "lower" valve relative to the control cylinder, which acts directly or through intermediate links, depends on the position of the cutter mechanism, and this arrangement is variable with reference to the position of the cutter mechanism for adjusting the required working position of the cutter mechanism.

4 Claims, 7 Drawing Figures

CONTROL DEVICE FOR RAISING AND LOWERING THE CUTTER MECHANISM OF HARVESTERS

The present invention relates to hydraulic control devices for raising and lowering the cutter mechanism of harvesters, for example combine harvesters.

In practice it is required to position the cutter table of a combined harvester in such a way that it is not necessary to support the whole weight of the cutter table on the ground. Moreover, it is advantageous to select and to maintain a required height of the mower cutter above the ground without the operator having to continuously control and correct this height.

Numerous experiments have previously been carried out to provide such a cutter positioning device. Most of the relevant experiments were carried out with sensing elements which slide over the ground, sense the surface of the ground and through links, Bowden cables or similar connecting elements adjust hydraulic control elements so that the pistons and cylinders, which are used in most cases for raising and lowering cutter assemblies on combine harvesters and operate in known manner, are extended or contracted by a pressure medium. The disadvantage of this method is that the sensing elements are only affected by the parts of the ground over which they slide — a cutter mechanism with a cutting width of 4–6 meters must therefore have a considerable number of sensing elements distributed over the whole of the cutting width — and moreover the sensing elements are nearly always disposed so far behind the cutter that they only respond after the cutter has already collided with a bump on the ground.

In other cases experiments have been made using contactless electrical sensing of the surface of the ground to produce pulses for operating control elements in the hydraulic system, in accordance with uneveness in the ground and a preset ground clearance, for raising or lowering the cutter.

The disadvantage of this device is that it responds even to small irregularities in the ground and thus causes continuous actuation of the control elements. Moreover, both of these prior devices have the disadvantage that the sensing elements or pulse generator can be damaged if brought into contact to the ground, and can therefore only with difficulty be kept in operation.

A useful device for distributing the weight of the cutter table so that only a small portion is supported on the ground and the major portion is supported in known manner by one or more hydraulic cylinders on the combine harvester, e.g., on the chassis, is an intermediate connection comprising a spring element between the chassis and the cylinder or the cylinder and the cutter mechanism or in the form of a hydraulic store at or in the cylinder or in the ducting. In this case, however, the preloaded spring element urges the pressure medium from the cylinder, when the operator maintains the control valve in its "lower" position, if the cutter mechanism has already been laid on the ground. The preloading of the spring elements, since they can extend, is lost and if required (when the cutter mechanism runs against an obstruction or against a bump in the ground) they are not able to urge the cutter mechanism upwards.

Consequently, a further known arrangement is to incorporate between the cutter assembly and the control apparatus a longitudinally extensible element which is acted on by the pressure in the cylinder so that in accordance with the pressure it actuates the control apparatus to raise or lower. The adjustment of the cutter table height relative to the fixed parts of the combined harvester is determined in the control apparatus itself by means of a wedge which alters the spacing between two abutments, in dependence on how far the wedge is pressed between the abutments by a hand lever. It is decided disadvantage of this arrangement that due to their constructional requirements, the transmission and adjusting elements can be only very slightly pivotable relative to the assembly to be controlled. The automatic actuation therefore takes place with too great a delay and the adjustment of a predetermined height of the cutter mechanism relative to the fixed parts of the combined harvesters is therefore subject to more or less large, undesired variations.

Moreover, with these known constructions, it is not possible to raise or lower the cutter mechanism from its preselected height adjustment relative to the stationary parts of the combine harvester without altering the height adjustment preset at the control apparatus in such a way that the cutter mechanism is automatically, and without attention by the driver, brought back to the preset height as soon as the driver initiates a corresponding operation. On the contrary, the driver has to reset the required height after each temporary alteration which may be required.

The above-described disadvantages are completely avoided by the control device according to the invention for positioning a cutter mechanism of a harvesting machine.

The considerable advantages and the objects which can be attained can be briefly summerized as follows, these objects being achieved separately or in combination:

1. When operating the combine harvester, the driver preselects the height adjustment, which is readable on a scale on the apparatus, and the apparatus automatically maintains this height adjustment.

2. The driver is able, in spite of this preselected height adjustment, to obtain by manual adjustment any required height adjustment without the preselected height adjustment thereby being altered. When this additional height adjustment has been terminated, the cutter mechanism automatically returns to the preselected height adjustment.

3. The lowering of the cutter mechanism when it is adjusted to its lowermost position is automatically discontinued as soon as a part of the weight of the cutter mechanism is supported on the ground.

4. When the cutter runs against a bump in the ground, and the weight of the cutter mechanism is thereby reduced, the control apparatus immediately switches to "raise."

5. When the cutter runs over a depression and the weight of the cutter mechanism is thereby increased, the control apparatus automatically is switched to "lower."

6. All operations are controlled without expensive and fragile sensing elements or electrical ground sensing devices and by means only the weight of the cutter mechanism supported on the ground. Furthermore, the weight supported on the crop lifters of a cutter mechanism should be sufficient for control purposes, since the crop lifters are a few centimeters lower than the mower cutter and more importantly because these contact the ground at a spacing of about 50 centimeters in front of the mower cutter, so that the control apparatus is operated before the actual part of the cutter mechanism, i.e., the mower cutter has reached an obstruction.

7. When turning at the end of a field, the driver should be able to effect raising of the cutter mechanism without having to retain his grip on an operating lever. Moreover, the control apparatus should automatically discontinue the raising operation as soon as the cutter mechanism has been raised to its highest position.

8. At the beginning of a new mowing operation, the driver need only to select the "lower" operation. The cutter mechanism is then automatically lowered to the preselected height and the control apparatus automatically discontinues the lowering of the operation.

The present invention provides a hydraulic control device for raising and lowering the cutter mechanism of a harvester, for example a combine harvester, which device is operable by manual actuation and by the hydraulic pressure in a displacement cylinder of the cutter mechanism through a control cylinder acting against a counterforce, and which device is for installation on a part of the combine harvester, preferably the drivers platform, which constitutes a stationary part as opposed to the movable cutter mechanism, wherein the arrangement of the actuating lever of the "raise" valve and/or the "lower" valve relative to the control cylinder, which acts directly or through intermediate links, depends on the position of the cutter mechanism, and this arrangement is variable with reference to the position of the cutter mechanism for adjusting the required working position of the cutter mechanism.

The control cylinder is operated, if required through intermediate elements, in dependence on the pressure in the displacement cylinder and the control cylinder to raise or lower the cutter mechanism as required. If the arrangement or adjustment of the "raise" and/or "lower" valve with respect to the control cylinder is altered, then automatically a different working pressure is adjusted in the hydraulic system and thereby the cutter mechanism is adjusted to a different position.

It is irrelevant whether the position of the actuating levers of the "raise" valve and the "lower" valve is altered or whether an intermediate element, which transmitts the movement of the control cylinder to the actuating lever, is altered in its position with respect to the control cylinder.

Alteration of the position or arrangement of the actuating lever or the intermediate element is effected according to the invention in dependence on the position of the cutter mechanism and may be effected by mechanical connecting means such as actuating cables, chains or links.

Preferably, spring elements are incorporated in these connecting means so that according to the position of the cutter mechanism a predetermined tension is exerted on the movable actuating lever or on the connecting means altering the position of the actuating lever. By means of a corresponding counter-spring, the position of this element with respect to the control cylinder serves to produce a corresponding operating position of the cutter mechanism.

By altering the tension in the actuation cable, a different position, for example, of the connection means with reference to the control cylinder, is provided by the co-operation with the counterspring, and thereby the pressure in the hydraulic system is simultaneously altered since the control valves are correspondingly operated.

For altering the spacing between the cutter mechanism and the arrangement of the actuating lever of the "raise" valve and/or the "lower" valve or the corresponding connecting means or the cable or pressure acting thereon, an operating lever which can be retained in different positions is arranged in the mechanical connection extending to the cutter mechanism.

According to a further, particularly advantageous embodiment of the present invention, an additional operating lever is provided which, independently of the arrangement of the actuating lever of the "raise" valve and the "lower" valve with reference to the control cylinder acting thereon or the position of the connecting means therebetween with reference to the control cylinder, enables operation of the "lower" valve or the "raise" valve.

This additional operating lever is preferably in the form of a hand lever and may be retainable in two operating positions and in a neutral position. In one operating position, it acts on the "lower" valve, and in the other operating position it acts on the "raise" valve.

According to another advantageous embodiment of the present invention, this operating lever is arranged as a foot pedal mechanism having the same functional positions.

Since the movements of the control cylinder take place relatively slowly it has been found particularly suitable according to a particularly advantageous embodiment of the invention to provide between the actuating lever of the "raise" valve and/or the "lower" valve and the control cylinder acting thereon, if required through intermediate elements, one or more intermediate links for storing the force of movement of the control cylinder, which intermediate element or elements provide, when this movement has exceeded a preselectable amount, an instantaneous actuating operation.

According to a particularly advantageous embodiment of the present invention, the intermediate element for storing the force of movement of the control cylinder comprises a lever pivotable about a pivot point and guided by means of a guide pin in a valve rod, the movement of the control cylinder being transferable to the free end of the lever in such a way that the lever snaps from one position through a dead point to another and the actuating operation is thereby carried out instantaneously.

It has furthermore been found to be advantageous if the arrangements of the actuating levers of the "raise" and the "lower" valve relative to the control cylinder which operates directly or through intermediate links, are variable independently of one another.

In the case where the control cylinder acts through an intermediate element, the position of which relative to the control cylinder is variable, as described above, ratchet members or the like acting on the "raise" and the "lower" valve on this intermediate element are preferably adjustable relative to one another.

The "raise" valve and the "lower" valve are preferably connected in a hydraulic circuit in such a way that when the "lower" valve is opened no pressure medium can flow out if the "raise" valve is in its "raise" position. A non-return valve may be arranged in the hydraulic circuit between the "raise" valve and the control cylinder and may be by-passed by the "lower" valve.

It has also been found to be advantageous if the hydraulic control duct to the control cylinder can be adjustably throttled or completely closed.

According to a particularly advantageous embodiment of the present invention, the control cylinder acts either directly or through a compression and tension spring on a slide sleeve which slides on a guide shaft and which acts through an actuating member adjustably secured thereto on the actuating lever of the "lower" valve or on the actuating lever of the "raise" valve. The position of the slide sleeve on the guide shaft and its position relative to the control cylinder may be adjustably controllable in dependence on the position of the cutter mechanism by a mechanical connection.

It has furthermore been found to be very advantageous if, adjacent to the slide sleeve sliding on the guide shaft, a second slide piece is slidably arranged which abuts against the slide sleeve and has a roller over which a cable from the cutter mechanism is guided to the operating lever for altering the spacing with the cutter mechanism. In this manner the position of the slide piece on the guide shaft is adjustable in dependence on the position of the cutter mechanism, and simultaneously the adjacent slide sleeve, which is provided with the adjustment member for the operation of the actuating lever, is adjusted in position relative to the control cylinder in dependence on the position of the cutter mechanism.

The additional operating lever which, as described above, enables both the "lower" valve and also the "raise" valve to be operated, has according to a particularly advantageous embodiment of the present invention a link element which acts on a spring retainer ring which seats the spring acting as a counter-force on the control cylinder.

With this embodiment, the "raise" valve and/or the "lower" valve is operated in such a manner that the force of the compression spring acting on the control cylinder is either increased or reduced. The position of the control cylinder is altered in accordance with the thus varying compression and counterpressure ratio, and this movement is transferred through the slide sleeve to the actuating lever of the "raise" or "lower" valve.

It is particularly advantageous if the link element connected to the operating lever has a longitudinal slot in which a guide bolt fixed to the spring retainer ring is slidably arranged. Preferably, a nose provided on the slide member is contacted by the link element when, for relieving the pressure exerted by the tension cable through the roller on the slide piece and thereby on the slide sleeve in one direction, the additional operating lever is moved in the opposite direction.

According to a further embodiment of the present invention, the "raise" valve comprises a magnetically operable valve which operated by a switch actuated by the spring element.

An adjustable pressure relief valve may be arranged in the hydraulic circuit between the pump and the non-return valve. This pressure relief valve serves to ensure that a further pressure increase in the hydraulic system is avoided when the cutter mechanism is fully raised and the additional operating lever is still in its "raise" position.

The operation lever in the mechanical connection for altering the spacing between the cutter mechanism and the arrangement of the valve actuating lever with reference to the control cylinder may comprise a worm.

The invention will be more readily understood from the following description of embodiments thereof given by way of example with reference to the accompanying drawings, in which.

Figure 1:
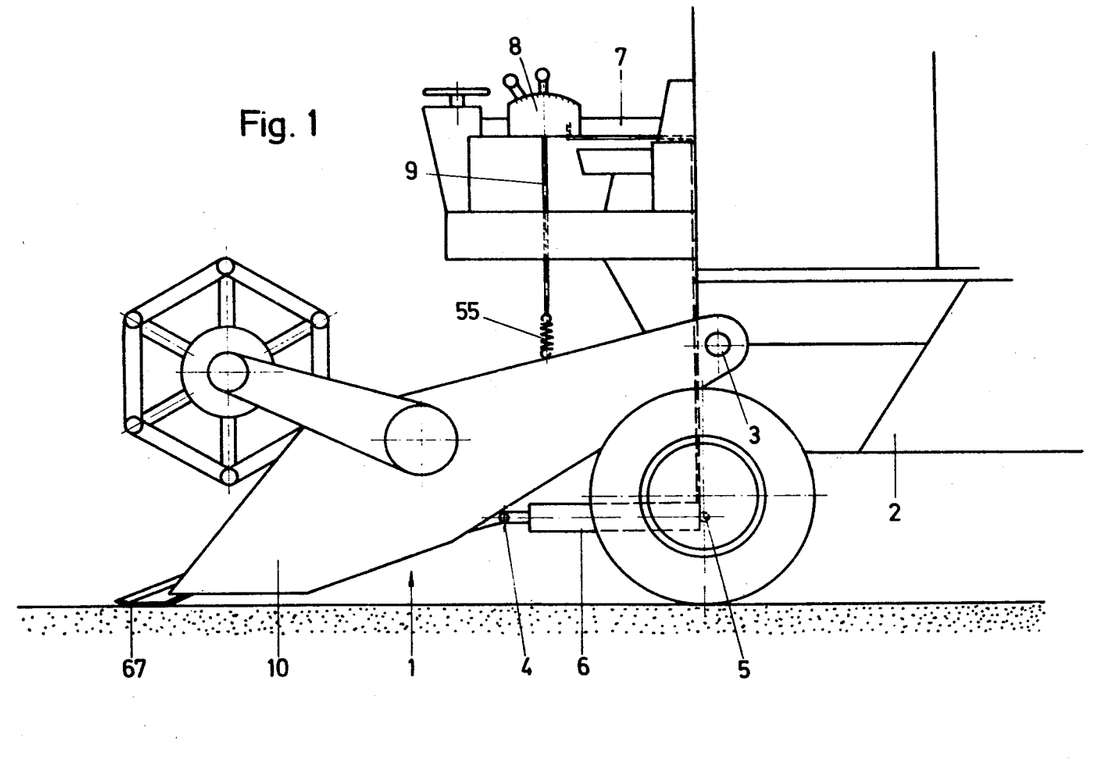
FIG. 1 shows a side view of a combined harvester with a hydraulic displacement device for the cutter mechanism.

As shown in FIG. 1, a cutter mechanism assembly 1 is pivotally connected in known manner as indicated by reference numeral 3 to combine harvester 2. A displacement cylinder 6, which is pivotally connected as indicated by reference numeral 4 to the cutter mechanism and by reference numeral 5 to the chassis of the combine harvester, and which operates hydraulically in known manner, determines the ground clearance of the cutter mechanism.

A driving platform 7 is fixed in position relative to the chassis, and the cutter mechanism is movable relative to the platform 7. A control apparatus 8 is mounted on the drivers platform 7, and thus on a fixed point of the combine harvester and is connected by a cable 9 to an inclined conveyor 10.

The control apparatus 8 (FIG. 2) comprises a control cylinder 11 urged in one direction by a compression spring 12 and movable in the opposite direction by hydraulic pressure in the cylinder space 13, which is equal to the pressure in the displacement cylinder 6. The control cylinder 11 is connected by a pressure duct 14 to the displacement cylinder 6, an adjustable and completely closable throttle 16 being incorporated in the control cylinder. The control cylinder 11 has a piston rod 15, which is adjustably fixed by nuts 18 to a housing 17, and the control cylinder 11 is displaceable along the piston rod 15. The compression spring 12 is supported by an adjustable spring retainer ring 19 and a threaded rod 20 secured to the housing 17. The spring retainer ring 19 is adjustably mounted on an extension 21 of the threaded rod 20. A slide 23, which slides on a guide shaft 24, forms a unit with a collar 22 on the control cylinder 11. One end of a compression and tension spring 25, abuts against the slide 23, the spring 25 also sliding on the guide shaft 24. At its other end, the compression and tension spring 25 is secured to a slide sleeve 26 which is displaceable on the guide shaft 24. An adjustment ring 27 is adjustably mounted on this slide sleeve 26.

Figure 2:
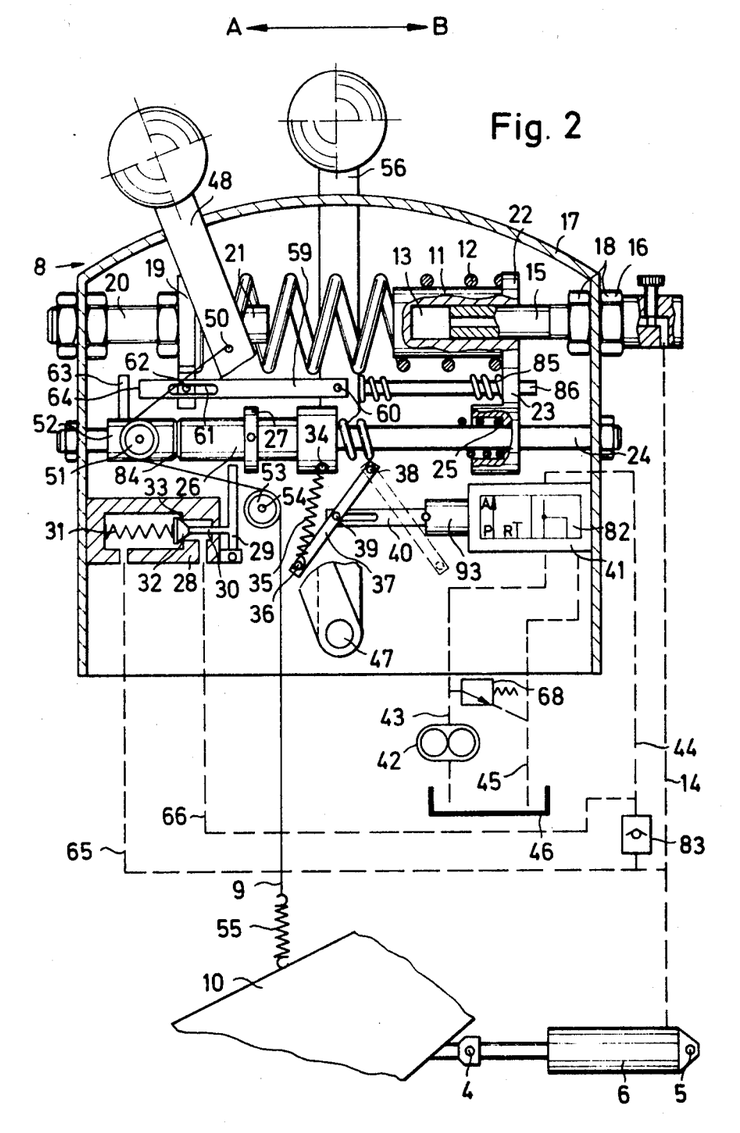
FIG. 2 shows a control apparatus for the hydraulic displacement device of FIG. 1 employing a mechanical actuation of a displacement valve.

A "lower" valve 28 fixed to the housing 17 has an actuating lever 29 which is pivotally secured to the valve housing and which through an actuating pin 30 can open a conical valve member 32 of the "lower" valve 28. The valve member 32 is urged by a compression spring 31 towards its seat 33.

One end of a tension spring 35 is hooked into an eye 34 in the slide sleeve 26 and its other end, as indicated by reference numeral 36, is hooked to a lever 37, which is pivotally connected at its other end 38 to the housing 17. Approximately at the middle of the lever 37, there is fixed a guide pin 39, which by means of a rod 40 actuates a "raise" valve 41. The displacement valve itself is a hydraulic control valve operating in known manner as indicated by the diaphragm 82, which moved to the right as viewed in the drawing connects the pressure medium, fed to it from pump 42 through pressure duct 43, through a working duct 44 incorporating a nonreturn valve 83, which opens in the direction towards the displacement cylinder 6, to the displacement cylinder 6. When the valve 41 is in its neutral position, in which it is shown in FIG. 2, it connects the pressure medium through a return duct 45 to a reservoir 46. Between the duct 43 and the return duct 45 there is incorporated a pressure relief valve 68.

Figure 4:
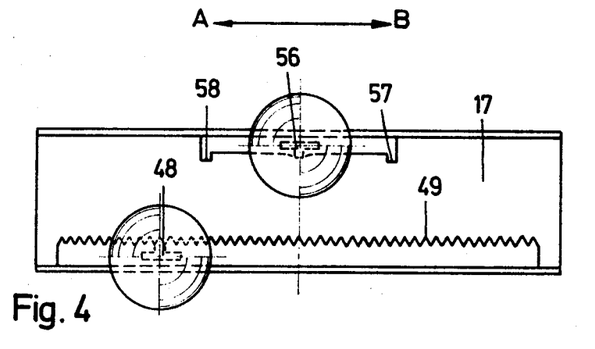
FIG. 4 shows part of the control apparatus of FIG. 2 viewed from above.

An operating lever 48 is pivotally mounted by a pivot 47 on the housing 17. The adjustment lever 48 can be engaged in known manner in the region of a ratchet 49 (FIG. 4) on the housing 17. The cable 9 is secured where indicated by reference numeral 50 to the adjustment lever 48 and is guided around a roller 51, which is supported on a further slide sleeve 52, slidably arranged on the guide shaft 24 beyond the slide sleeve 26 abutting where indicated by reference numeral 84 against the slide sleeve 26, and a further roller 53 mounted a pin 54 projecting from the housing 17, towards the inclined conveyor 10 of the cutter mechanism assembly 1, at which one end of the cable 9 is connected by a tension spring 55 to the inclined conveyor 10.

A second manually actuable operating lever 56 is mounted where indicated by reference numeral 47 on the housing 17. The lever 56 can be engaged in the direction B in a one-step ratchet 57 (FIG. 4) and in the direction A in a one-step ratchet 58. A plate 59 is pivotally connected at one end where indicated by reference numeral 60 to the adjustment lever 56, and has at its other end a longitudinal slot 61. A guide pin 62, fixed to the spring retainer ring 19, can slide in either direction A – B in the longitudinal slot 61 when the operating lever 56 is not engaged in one of the ratchets 57 and 58.

A nose 63 is fixed on the slide sleeve 52, and as described below the rear end 64 of the plate 59 can press against the nose 63.

A compression spring 85 bears against the operating lever 56 opposite the plate 59 and against the slide 23. For guiding the spring, a shaft 86 is pivotally mounted at one end on the adjustment lever 56 and slides at its other end in a corresponding opening (not shown) in the slide 23.

In a modification of the above-described control apparatus provided with an operating shaft for the cable 9, the operating lever 48 and the ratchet 49 are omitted. A shaft 87 (FIG. 6) is mounted where indicated by reference numeral 88 in the housing 17 and comprises, at its part projecting from the housing, a hand crank 89. A nut 90 on the shaft 87 can be moved in direction A or B, by rotation of the shaft 87 in the appropriate direction. The nut 90 has a nose 91 which serves as an indicator guided in a slot 92 in the housing 17, and which both prevents rotation of the nut 90 by the rotary movement of the shaft 87 and provides on the outside of the housing 17 an indication of the position of the nut 90.

When the cutter mechanism is lowered, the operating lever 48 is adjusted into its outermost, left-hand position in the direction A. The length of the cable 9 is such that in this case it is just unloaded. If the cutter mechanism then has to be raised, the operating lever 48 is drawn, in the direction B. The cable 9 is thereby tightened and the roller 51 fixed to the slide piece 52 draws the latter in the direction B against the slide piece 26. This overcomes the compression spring force of the compression and tension spring 25, and the tension spring 35 engaged in the eye 34 is drawn in the direction B. The tension spring 35 is thereby tensioned, and when it has been drawn in the direction B as far as the pivot 38 of the lever 37, the lever 37 suddenly springs about its pivot 38 in the direction B into the position shown in broken lines. The guide pin 39 then strikes against the right-hand end of the longitudinal slot in the rod 40 and actuates the valve 41 to "raise" by pressing the control slide 93 in the direction B.

The longitudinal slot in the rod 40 ensures that the sprung movement of the spring element formed by the tension spring 35 and the lever 37 is not braked. The spring element has therefore reached its full force before it meets the resistance of the slide 93 to movement in the valve 41. The valve slide 93 is consequently displaced instantaneously. The displacement operation continues as long as the operating lever 48 is displaced in the direction B. If this movement is interrupted, the tension in the cable 9 is relieved, since the cutter mechanism has been raised. The compressed tension and compression spring 25 thereupon displaces the slide sleeve 26 and the slide sleeve 52 in the direction A. The tension spring 35 is secured to the slide sleeve 26 moves past the pivot 38 of the lever 37 in the direction A, and the lever 37 therefore springs back into its neutral position. The valve 41 is thereby also moved into its neutral position.

If it is now required to lower the cutter mechanism the operating lever 48 is moved in the direction A. The cable 9 is again untensioned. The compression and tension spring 25 urges the slide sleeve 26 and the slide sleeve 52 so far in the direction A that the ring 27 presses against the lever 29 of the "lower" valve 28. The lever 29 presses against the pin 30, which opens the valve 26 by displacing the valve member 32 against the compression force of the compression spring 31 from its seat 33. The pressure medium can now flow from the cylinder 6 through ducts 65 and 66 and the displacement valve 41, and when this is in its neutral position, through the return duct 45 to the reservoir 46. The cutter mechanism is thereby lowered.

In the above-described manner it is possible to preselect any required height of the cutter mechanism by means of the operating lever 48 without the driver having to observe the cutter mechanism. Moreover, he can read the adjusted height from a scale (not shown) associated with the ratchet 49.

For crops lying on the ground the cutter mechanism should be guided very close to the ground or with a small part of its weight sliding on the ground.

If the cutter mechanism bears against the ground (for example by means of crop lifters 67) and therefore has a part of its weight supported on the ground, the pressure in the cylinder 6 decreases and simultaneously the pressure in the control cylinder 11, which is connected to the cylinder 6 by the duct 14, also decreases. The compression spring 12 can then extend and urges the control cylinder 11 in the direction B. The compression and tension spring 25 is thereby relieved and the slide piece 26 and the actuating ring 27 also move in the direction B. The valve 28 closes and the lowering operation is interrupted.

If the cutter mechanism runs against a bump in the ground, the pressure in the cylinder 6 is still further reduced since the ground then presses the cutter mechanism upwardly. The pressure in the pressure space 13 of the control cylinder 11 is further reduced and the control cylinder 11 is urged by the spring 12 further in the direction B. By the compression and tension spring 25, the sleeve 26 is likewise drawn in the direction B until the valve 41 is actuated to "raise" by the above-described spring element 35/37 and the rod 40.

After the obstruction or bump has been passed, the pressure in the cylinder 6 and the control cylinder 11 rises again, the control cylinder 11 is urged in the direction A, and the slide sleeve 26 is drawn by the spring 25 in the direction A. By the spring element 35/37 and the rod 40, the "raise" valve is again moved to its neutral position.

If the cutter mechanism passes over a depression in the ground then lowering is automatically effected as described above and when the depression has been passed raising is automatically effected.

Thus, without the driver adjusting the control apparatus, the control apparatus effects vertical displacement of the cutter table so that the cutter table is supported with only a part of its weight on the ground and is moved up and down in accordance with irregularities in the ground.

When the driver has adjusted the cutter mechanism to a particular cutting height by means of the operating lever 48, he can alter the cutting height by means of the second operating lever 56 without altering the adjustment of the operating lever 48. This is very advantageous when, as he turns at the end of a field, he has to raise the cutter mechanism or if, to mow a crop lying in a field, he needs to lower the cutter mechanism briefly into contact with the ground. When turning at the end of a field, he grasps the second operating lever 56 and engages it in the ratchet 57. The rod 59 is thereby drawn in the direction B and, through the guide pin 62, draws the spring retainer ring 19, which is slidably supported on the extension 21 of the threaded rod 20, in the direction B. The spring 12 is thereby compressed and urges the control cylinder 11 in the direction B. Through the compression and tension spring 25, the slide sleeve 26, the spring element 35/37 and the rod 40, the "raise" valve 41 is switched to its "raise" position. The pressure created in the cylinder 6 and the control cylinder 11 by the weight of the cutter mechanism is no longer sufficient to press the control cylinder 11 in the direction A. However, as soon as the cutter mechanism has reached it highest possible position, i.e., when the piston of the cylinder 6 has reach abutment, the pressure in the ducts 34 and 14 increases to a value which can be adjusted by means of the pressure relief valve 68. This value is adjusted in the present case so that it is considerably higher than the pressure which is produced in the cylinder 6 and the control cylinder 11 by the weight of the cutter mechanism supported by the cylinder 6. In spite of the higher loading of the compression spring 12 by the above-mentioned engagement of the lever 56 in the ratchet 57 and the consequential displacement of the spring retainer ring 19 in the direction B, the higher pressure moves the control cylinder 11 in the direction A until the "raise" valve 41 is moved into its neutral position by the above-mentioned actuating elements 23/25/26/35/37 and 40.

As an alternative to increasing the compression force of the spring 12 by the displacement of the spring retainer ring 19 in the direction B, the compression force of the spring 12 can be assisted in a different manner by adjusting the lever 56 in the direction B until it engages in the ratchet 57. The longitudinal slot 61 of the rod 59 is in this case made longer so that the spring retainer ring 19 is not moved by the rod 59 when the lever 56 is adjusted in the direction B. The guide pin 62 on the spring retainer ring 19 then serves only as a guide for the rod 59, which only has the purpose of pressing, as described in greater detail below, against the nose 63 of the slide sleeve 52. The assisting of the compression force of the spring 19 is effected by the compression force of the spring 85, one end of which is supported on the operating lever 56 opposite the rod 56 and the other end of which is supported on the slide 23. By adjustment of the operating lever 56 in the direction B as far as the ratchet 57, the compression spring 85 is loaded and assists the spring 12. Just as in the case where the pressure of the spring 12 is increased by displacement of the spring retainer ring 19 in the direction B, the loading of the compression spring 85 is just sufficiently high to ensure that the higher pressure in the pressure chamber 13, when the preset excess pressure is reached, urges the control cylinder in the direction A until, as described above, the actuating elements 23/25/26/35/37 and 40 move the "raise" valve 41 to its neutral position.

The driver is therefore able, when turning at the end of a field, to operate the control apparatus by one hand to raise the cutter mechanism, without having to hold the operating lever 56 still until the cutter mechanism has been raised and without having to alter the adjustment of operating lever 48. Moreover, the control apparatus automatically discontinues the lifting as soon as the cutter mechanism has reached its highest position.

When beginning the next stretch of mowing, the driver merely has to disengage the operating lever from the ratchet 57. The loading or compression force of the spring 25 then returns to its adjusted lower value, the control cylinder 11 is urged by the hydraulic pressure in its compression chamber 13 in the direction A, and by means of the actuating elements 23/25 and 26 the actuating ring 27 is pressed against the actuating lever 29 of the lower valve 28 and, through the actuating pin 30, actuates the lower valve to "lower." The cutter mechanism now sinks so far that it again tightens the cable 9, which was untensioned by the preceding raising. By means of the roller 53 the cable 9 then draws the roller 51 and the slide piece 52 in the direction B and likewise urges the slide sleeve 26 with the ring 27 in the direction B. The actuating lever 29 can no longer press on the actuating pin 30 and the spring 31 urges the valve member 32 against its seat 33 and closes the valve 28. Without the driver again adjusting the height of the cutter mechanism, the latter thus is lowered to the value preselected by the operating lever 48 and the lowering is automatically interrupted when this value has been reached.

If the driver now wishes briefly to set the cutter mechanism lower, when for example a small area of crop lying on the ground has to be taken up, he can leave the operating lever 48 in its position. He merely presses the lever 56 in the direction A. In order to leave his hands free he can engage the lever 56 in the ratchet 58. The end 64 of the rod 59 then presses against the nose 63 on the slide piece 52. The slide piece 52 is pressed in the direction A and the pressure in the control cylinder 11, which is full when the cutter mechanism is floating, through the actuating elements 23/25/26/27 and 29 urges the "lower" valve 28 to its "lower" position. As soon as the cutter mechanism bears against the ground and has a part of its weight supported on the ground, the pressure in the displacement cylinder 6 and the control cylinder 11 is reduced. The control cylinder 11 is displaced in the direction B and the slide sleeve 26 with the actuating ring 27 are likewise moved in the direction B; the lowering is interrupted, although the end 64 of the rod 59 presses against the nose 63 and the slide 52 therefore remains pressed in the direction A. In this way it is ensured that the whole weight of the cutter mechanism cannot be laid on the ground when the operating lever 56 is engaged in the ratchet 58.

When the cutter mechanism is lowered in the above-described manner, the lever 48 remains in its adjusted position of engagement with the ratchet 49. Since the cable 9 cannot be extended downwardly, the tension spring 55 is stretched in a vertical direction and therefore has a higher tension. If the driver, having travelled past the laid crop area, disengages the operating lever 56 from the ratchet 58 in the direction B, the pressure through the rod 59 and the nose on the slide piece is relieved. The tension spring 55, which is tensioned by the lowering, draws the cable 9 downwardly. Through the rollers 54 and 51 the slide piece 52 is again drawn in the direction B. Through the slide sleeve 26, the slide piece 52 compresses the compression and tension spring 25 and the tension spring 25, which is secured to the slide sleeve 26, actuates the displacement valve 41 to its "raise" position through the lever 37 and the rod 40. The cutter mechanism is now raised until the tension spring 55, which was stretched by the lowering, is again relaxed. The force of the compression and tension spring 25 presses the slide sleeve 26 back in the direction A, and the displacement valve 41 is again moved to its neutral position by the spring 35, the lever 37 and the rod 40.

In this way, the control apparatus automatically returns the cutter mechanism to any height preselected by the operating lever 48 as soon as the second operating lever 56 is brought into its neutral position.

Figure 6:
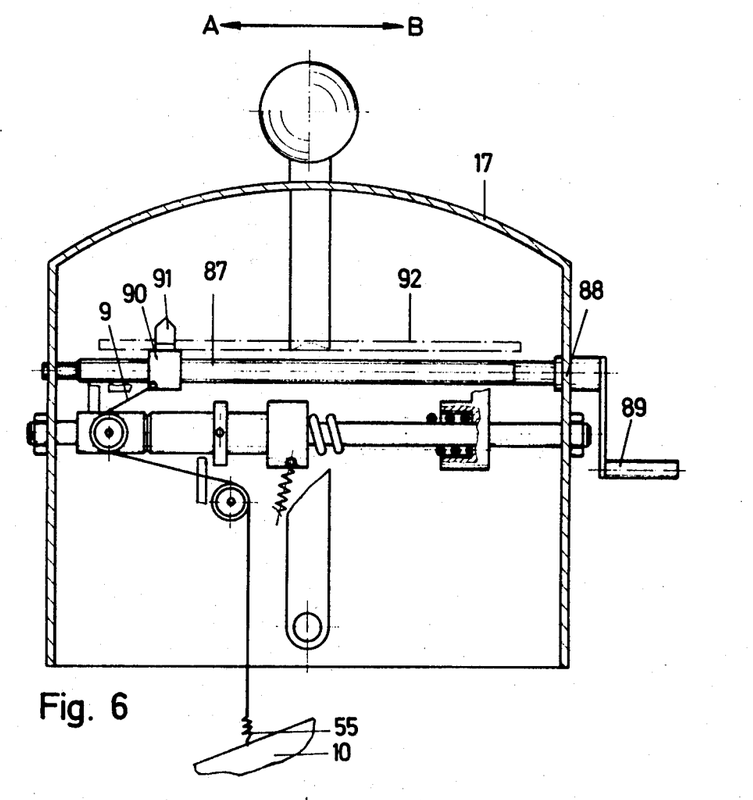
FIG. 6 shows a modification of the control apparatus of FIG. 2 employing an adjustment shaft.
Figure 7:
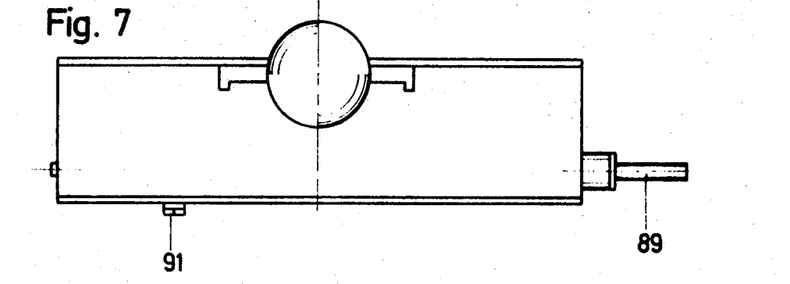
FIG. 7 shows the control apparatus of FIG. 6 viewed from above.

In another embodiment the operating lever 48 is replaced by a shaft 87 (FIGS. 6 and 7). The shaft 87 fulfills the above-described functions of the operating lever 48. By rotation of the shaft 87 by means of the hand crank 89, the nut 90 is moved in the direction A or B depending on the direction of the rotation. The cable 9 is secured to the nut 90 and is pulled or released relative depending on the rotation of the shaft 87. An indication of the height adjustment is provided by the indicator-like nose 91, which is guided in a slot 92 in the housing 17 and which also prevents the rotational forces of the shaft 87 from rotating the nut 90.

Figure 5:
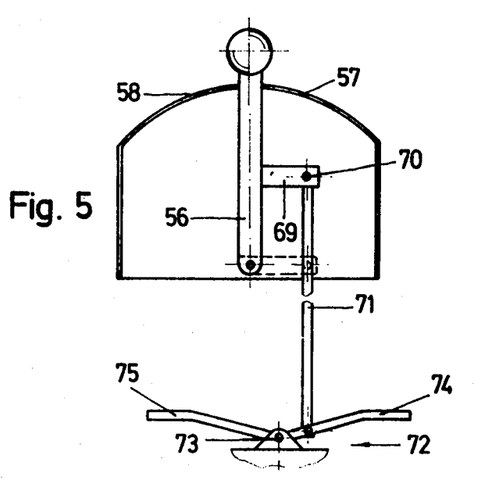
FIG. 5 shows a modification of the control apparatus of FIG. 2 employing a foot-actuated adjustment lever.

As seen from the operating position, it is desirable to be able to put in operation the functions of the operating lever 56 by a foot pedal. In this case an actuating arm 69 is fixedly connected at right angles to the adjustment lever 56 (FIG. 5). A link 71, which is pivotally connected to the switch arm 69 where indicated by reference numeral 70, extends from the arm 69 to a foot pedal arrangement indicated generally by reference numeral 72, which is pivotally supported where indicated by reference numeral 73 on the driving platform. If the driver wishes to carry out the above-described control operation of the operating lever 46 by adjusting it to engagement with the ratchet 57, he presses a foot pedal 74 downwardly with his foot. The linkage 71 is thereby drawn downwardly and through the arm 69 the operating lever 56 is drawn in the direction B. After completing the required control operation, he presses the foot pedal 75 so far downwardly that the foot pedal 74, through the link 71, presses the arm 69 upwardly again. The adjustment lever 56 thereby returns to its neutral position.

If the above-described operation of positioning the adjustment lever 56 into engagement with the ratchet 58 has to be carried out, the driver presses the foot pedal 75 downwardly so far that the link 71 presses the arm 69 upwardly until the operating lever 56 is swung in the direction A as far as the ratchet 58. When the desired control operation has been completed, the driver then again presses the foot pedal 74 so far downwardly that the operating lever 56 again returns to its neutral position.

The above described foot pedal arrangement is only one embodiment the functions of which can be fulfilled by various other constructional arrangements of the foot pedal mechanism. The operating lever 56 may also be entirely omitted and the ratchets 57 and 58 may be included in the foot pedal mechanism. The arm 69 then replaces the operating arm 56 and is pivoted where indicated by reference numeral 47 (as indicated in broken lines in FIG. 5).

In a further embodiment, the above-described control arrangement is provided with a magnetically actuated "raise" valve.

In hydraulic systems which operate with high pressures, it may happen that the spring element formed by the tension spring 35 and the actuating lever 37 does not provide sufficient force to overcome the resistance of the displacement valve 41 to operation of the latter. In this case, the displacement valve 41 is magnetically actuated. For this purpose in place of the rod 40, an end switch 36 (FIG. 3) is mounted on the housing 17 of the control apparatus. This end switch 36 is connected to the electrical system of the combine harvester in such a manner that it closes a circuit to a magnet 77 (FIG. 3) as soon as the spring element formed by the spring 35 and the lever 37 is moved into the "raise" position (shown in broken lines). The lever 37 in this case contacts a switch knob 78 on the end switch 76 and completes a circuit through the magnet 77 and the conductors 79 and 80. The magnet 77 then actuates the displacement valve to raise the cutter mechanism.

Figure 3:
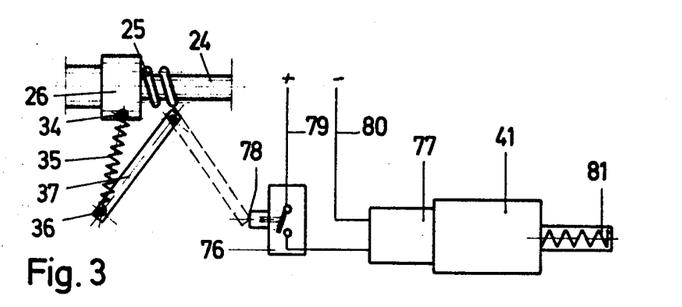
FIG. 3 shows a control apparatus similar to that of FIG. 2, but employing magnetic operation of the displacement valve.

When the circuit is again interrupted by operation of the spring element, a preloaded spring 81 in or at the displacement valve 71 returns the valve 41 to its neutral position.

The spring element which is used for operating the valve 41 and which instantaneously effects the switching operation in response to variation of the pressure in the hydraulic system above or below a predetermined level is an important component of the above-described apparatus. Without this spring effect the actuating operation would in practice not take place instantaneously in response to the hydraulic pressure of the control cylinder, which is continuously moved to and fro.

The above-described spring element is however only to be regarded as an example, and can be modified in various different ways known from other mechanisms.

What we claim is:

1. In a harvester, cutter means normally operating with part of its weight resting on the ground, hydraulic displacement means operatively connected with said cutter means for raising and lowering the same, said hydraulic displacement means including piston and cylinder members one of which is movable relative to the other during raising and lowering of said cutter means by said displacement means, and said movable member of said displacement means responding to ground elevations or depressions engaged by said cutter means for automatically changing the hydraulic pressure in said displacement means, hydraulic control means communicating with said displacement means and maintained at the same pressure as said displacement means, said hydraulic control means also including piston and cylinder members one of which is movable relative to the other, said movable member of said hydraulic control means moving when said movable member of said displacement means moves, lowering valve means hydraulically connected with said cylinder member of said displacement means for actuating the latter to lower said cutter means and raising valve means hydraulically connected with said cylinder member of said displacement means for actuating the latter to raise said cutter means, said lowering valve means and said raising valve means being spaced from each other, valve-actuating means movable along a path between said lowering valve means and said raising valve means for moving in one direction to actuate said lowering valve means and in an opposite direction to actuate said raising valve means, said hydraulic control means being operatively connected with said valve actuating means for automatically operating the latter to actuate said lowering valve means when said cutter means encounters a depression in the ground and said raising valve means when said cutter means engages an elevation in the ground, and selecting means operatively connected with said valve-actuating means for operating the latter to actuate one or the other of said valve means for situating said cutter means at a selected operating elevation.

2. The combination of claim 1 and wherein a second selecting means is operatively connected with said valve-actuating means for operating the latter to actuate said raising valve means or said lowering valve means independently of said first-mentioned selecting means, said second selecting means having a neutral position releasing said valve-actuating means to operate automatically for returning said cutter means to the operating elevation selected by said first-mentioned selecting means.

3. The combination of claim 1 and wherein said valve-actuating means includes a rod, a sleeve slidable along said rod, and means carried by said sleeve for actuating said lowering valve means when said sleeve moves in one direction along said rod and said raising valve means when said sleeve moves in an opposite direction along said rod, spring means situated between said sleeve and said movable member of said hydraulic control means for transmitting the movement between said movable member of said hydraulic control means and said sleeve for providing automatic operation of said valve-actuating means, and a motion-transmitting means connected between said selecting means and said sleeve for shifting the latter in response to operation of said selecting means.

4. The combination of claim 3 and wherein said means carried by said sleeve for actuating said lowering valve means and said raising valve means includes a collar fixed to said sleeve, said lowering valve means having an operating lever situated in the path of movement of said collar to be actuated thereby, and a toggle-lever mechanism connected between said sleeve and said raising valve means for operating said raising valve means upon displacement of said toggle-lever mechanism through a dead center position.

* * * * *